(12) United States Patent
Zamyatin et al.

(10) Patent No.: US 8,917,922 B2
(45) Date of Patent: Dec. 23, 2014

(54) CONCURRENT UPDATE ITERATIVE RECONSTRUCTION (IR) METHOD AND SYSTEM

(75) Inventors: Alexander Zamyatin, Hawthorn Woods, IL (US); Daxin Shi, Vernon Hills, IL (US); Mihail Petru Dinu, Mundelein, IL (US)

(73) Assignees: Kabushiki Kaisha Toshiba, Tokyo (JP); Toshiba Medical Systems Corporation, Otawara-Shi (JP)

( * ) Notice: Subject to any disclaimer, the term of this patent is extended or adjusted under 35 U.S.C. 154(b) by 108 days.

(21) Appl. No.: 13/524,440

(22) Filed: Jun. 15, 2012

(65) Prior Publication Data
US 2013/0336561 A1    Dec. 19, 2013

(51) Int. Cl.
*G06K 9/00*    (2006.01)
(52) U.S. Cl.
USPC ......................................................... 382/131
(58) Field of Classification Search
None
See application file for complete search history.

(56) References Cited

PUBLICATIONS

Pan, Yongsheng, et al. "TV-regularized iterative image reconstruction on a mobile C-ARM CT." SPIE Medical Imaging. International Society for Optics and Photonics, 2010.*

Defrise, Michel, Christian Vanhove, and Xuan Liu. "An algorithm for total variation regularization in high-dimensional linear problems." Inverse Problems 27.6 (2011): 065002.*
Johnston, S. M., G. A. Johnson, and C. T. Badea. "GPU-based iterative reconstruction with total variation minimization for micro-CT." Proceedings of SPIE. vol. 7622. 2010.*
Emil Y. Sidky, Chien-Min Kao, and Xiaochuan Pan, "Accurate image reconstruction from few-views and limited-angle data in divergent-beam CT", J. X-ray Sci. Tech., vol. 14, pp. 119-139, (2006).
Ludwig Ritschl, Frank Bergner, Christof Fleischmann, and Marc Kachelrieβ, "Improved total variation-based CT image reconstruction applied to clinical data", Phys. Med. Biol. 56 (2011), pp. 1545-1561.
Emil Y. Sidky and Xiaochuan Pan, "Image reconstruction in circular cone-beam computed tomography by constrained, total-variation minimization", Phys. Med. Biol. 53 (2008), pp. 4777-4807.

* cited by examiner

*Primary Examiner* — Nirav G Patel
(74) *Attorney, Agent, or Firm* — Yoshida & Associates, LLC

(57) ABSTRACT

The CT imaging system optimizes its image generation by updating an image with the current application of a data fidelity update and a regularization update together in a single step in an iterative reconstruction algorithm. The iterative reconstruction algorithm includes the ordered subsets simultaneous algebraic reconstruction technique (OSSART) and the simultaneous algebraic reconstruction technique (SART). The data fidelity update and the regularization update are independently obtained using some predetermined statistical information such as noise and or error in matching the real data.

16 Claims, 11 Drawing Sheets

US 8,917,922 B2

CONCURRENT UPDATE ITERATIVE RECONSTRUCTION (IR) METHOD AND SYSTEM

FIELD OF THE INVENTION

The current invention is generally related to an image processing method and system, and more particularly related to optimize image quality by updating an image using a pair of image updates together at the same time in a single step in an iterative reconstruction algorithm.

BACKGROUND OF THE INVENTION

For volume image reconstruction, an iterative algorithm has been developed by various groups. One exemplary algorithm is a total variation (TV) minimization iterative reconstruction algorithm for various applications including sparse views and limited angle x-ray CT reconstruction. Another exemplary algorithm is. a TV minimization algorithm aimed at region-of-interest (ROI) reconstruction with truncated projection data in many views, i.e., interior reconstruction problem. Yet another exemplary algorithm is a prior image constrained compressed sensing (PICCS) method. Total-variation-based iterative reconstruction (IRTV) algorithms have advantages for sparse view reconstruction problems.

In the prior art attempts, the data processing procedure of well-known IRTV algorithms is illustrated in FIG. 1. For example, simultaneous algebraic reconstruction technique (SART) generates the computed projection data from the image volume and back-projects the normalized difference between the measured projection and the computed projection data to reconstruct an updated image volume. In general, the sharpness is resulted due to a reduced number of errors in matching the real data while noise is increased in the updated image. As a result, the update image may appear sharp but noisy at the same time. Then, the updated image volume is regularized by total variation (TV) minimization routine in order to reduce noise at the cost of resolution.

The first prior art processing procedure as illustrated in FIG. 1 is of a sequential scheme. That is, the TV module follows the SART or alternatively projection on convex sets (POCS) module. The original image $x^{(n-1)}$ is processed by the SART routine to reduce an error amount in matching the real data and outputs an intermediate image or image update $x_{SART}^{(n)}$, which now has an increased amount of noise. As the intermediate image or image update $x_{SART}^{(n)}$ is obtained at an improved level of resolution, the original image $x^{(n-1)}$ is updated based upon the image update $x_{SART}^{(n)}$. Then, the intermediate image $x_{SART}^{(n)}$ is processed by the TV routine to reduce noise and generate an output image $x^{(n)}$, which now has an increased amount of the error. As the output image update $x^{(n)}$ is obtained, the original image $x^{(n-1)}$ is updated based upon the output image $x^{(n)}$. Due to the above described sequential nature of the processing, the effect of the SART routine initially reduces the error while the TV routine improves the noise in a disjointed manner with regaining the error. Consequently, it still remains desirable to control the noise-resolution trade-off.

The second prior art processing procedure as illustrated in FIG. 2 has the same sequential scheme of performing SART first and then TV except for the generation of the output image $x^{(n)}$. Despite the difference, the procedure in FIG. 2 generally yields the same undesirable characteristics as described with respect to the procedure in FIG. 1. The original image $x^{(n-1)}$ is processed by the SART routine to reduce an error amount in matching the real data and outputs a first intermediate image or image update $x_{SART}^{(n)}$, which now has an increased amount of noise. As the first intermediate image $x_{SART}^{(n)}$ is obtained at an improved level of resolution, the original image $x^{(n-1)}$ is updated based upon the first intermediate image $x_{SART}^{(n)}$. Then, the first intermediate image $x_{SART}^{(n)}$ is processed by the TV routine to reduce noise and generate a second intermediate image $x_{REG}^{(n)}$, which now has an increased amount of the error. As the second intermediate image $x_{REG}^{(n)}$ is obtained, the second intermediate image $x_{REG}^{(n)}$ and the first intermediate image $x_{SART}^{(n)}$ are summed together to obtain an output image $x^{(n)}$, the original image $x^{(n-1)}$ is updated based upon the output image $x^{(n)}$. Although the procedure in FIG. 2 has a parameter λ for manually controlling the effects of SART first and then TV, it still remains desirable to control the noise-resolution trade-off.

DETAILED DESCRIPTION OF THE EMBODIMENT(S)

Figure 1:
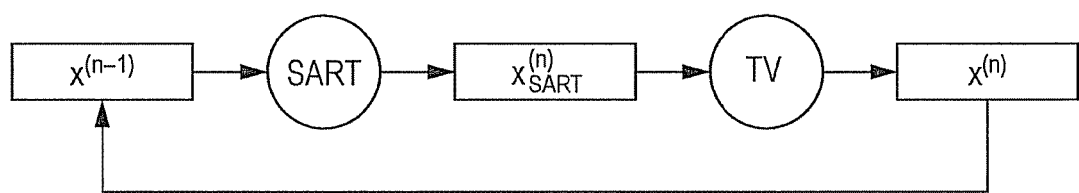
FIG. 1 is a diagram illustrating steps involved in one prior art process of the Total Variation Iterative Reconstruction (TV-IR).
Figure 2:
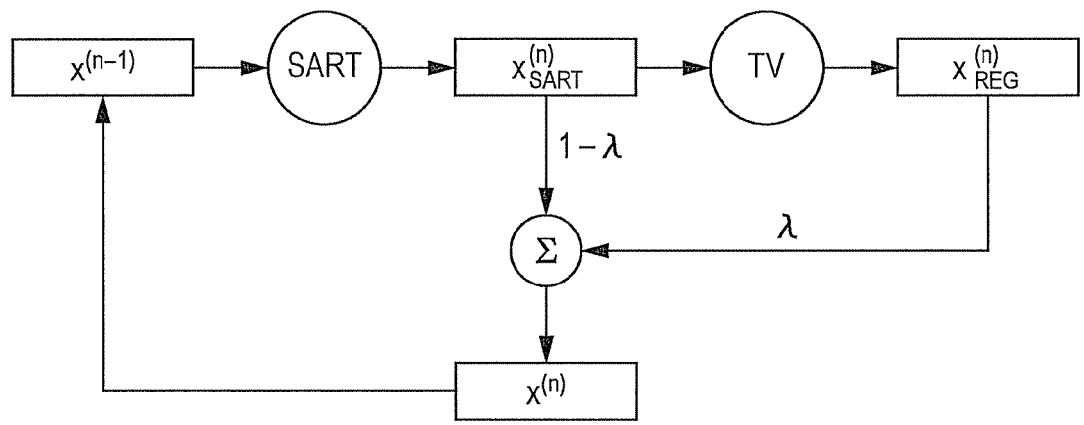
FIG. 2 is a diagram illustrating steps involved in another prior art process of the Total Variation Iterative Reconstruction (TV-IR).
Figure 3:
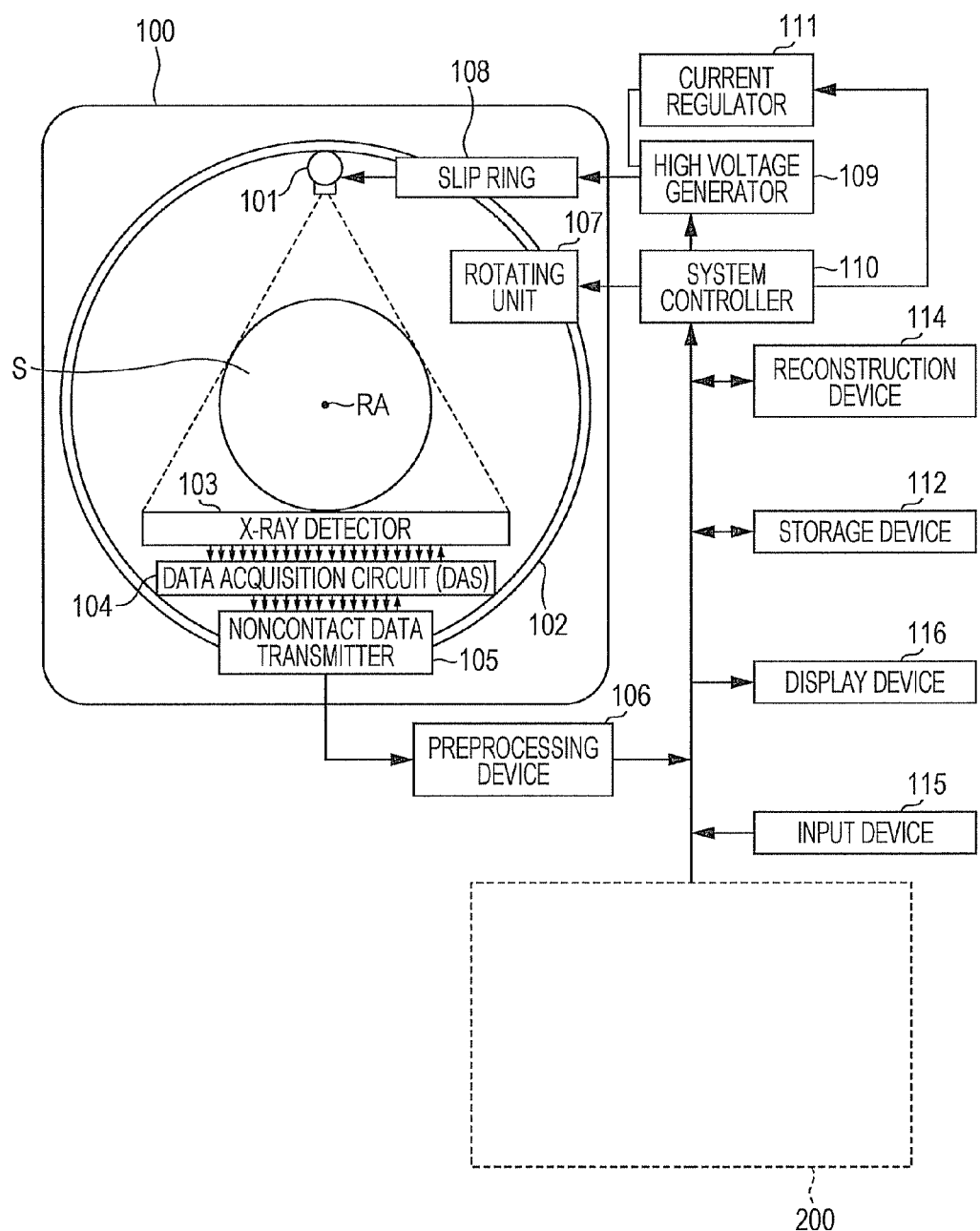
FIG. 3 is a diagram illustrating one embodiment of the multi-slice X-ray CT apparatus or scanner according to the current invention.

Referring now to the drawings, wherein like reference numerals designate corresponding structures throughout the views, and referring in particular to FIG. 3, a diagram illustrates one X-ray CT apparatus or scanner according to the current invention including a gantry 100 and other devices or units. The gantry 100 is illustrated from a side view and further includes an X-ray tube 101, an annular frame 102 and a multi-row or two-dimensional array type X-ray detector 103. The X-ray tube 101 and X-ray detector 103 are diametrically mounted across a subject S on the annular frame 102, which is rotatably supported around a rotation axis RA. A rotating unit 107 rotates the frame 102 at a high speed such as 0.4 sec/rotation while the subject S is being moved along the axis RA into or out of the illustrated page.

The multi-slice X-ray CT apparatus further includes a high voltage generator 109 and a current regulator 111 that respectively control a tube voltage and a tube current in the X-ray tube 101 through a slip ring 108 so that the X-ray tube 101 generates X ray in response to a system controller 110. The X rays are emitted towards the subject S, whose cross sectional area is represented by a circle. The X-ray detector 103 is located at an opposite side from the X-ray tube 101 across the subject S for detecting the emitted X rays that have transmitted through the subject S. The X-ray detector 103 further includes individual detector elements or units that are conventional integrating detectors.

Still referring to FIG. 3, the X-ray CT apparatus or scanner further includes other devices for processing the detected signals from X-ray detector 103. A data acquisition circuit or a Data Acquisition System (DAS) 104 converts a signal output from the X-ray detector 103 for each channel into a voltage signal, amplifies it, and further converts it into a digital signal. The X-ray detector 103 and the DAS 104 are configured to handle a predetermined total number of projections per rotation (TPPR) that can be at the most 900 TPPR, between 900 TPPR and 1800 TPPR and between 900 TPPR and 3600 TPPR.

The above described data is sent to a preprocessing device 106, which is housed in a console outside the gantry 100 through a non-contact data transmitter 105. The preprocessing device 106 performs certain corrections such as sensitivity correction on the raw data. A storage device 112 then stores the resultant data that is also called projection data at a stage immediately before reconstruction processing. The storage device 112 is connected to the system controller 110 through a data/control bus, together with a reconstruction device 114, an input device 115, a display device 116 and the scan plan support apparatus 200. The scan plan support apparatus 200 includes a function for supporting an imaging technician to develop a scan plan.

One embodiment of the reconstruction device 114 further includes various software and hardware components. According to one aspect of the current invention, the reconstruction device 114 of the CT apparatus advantageously minimizes total variation (TV) using an iterative reconstruction technique suitable for parallel computation. In general, the reconstruction device 114 in one embodiment of the current invention operates the total variation iterative reconstruction (TVIR) algorithm, which performs on the projection data an ordered subset simultaneous algebraic reconstruction technique (OS-SART) step and a TV minimization step.

During the ordered subsets simultaneous algebraic reconstruction technique (OS-SART), the reconstruction device 114 also performs two major operations. Namely, the reconstruction device 114 re-projects the image volume to form the computed projection data and back-projects the normalized difference between the measured projection and the computed projection data to reconstruct an updated image volume. In further detail, one embodiment of the reconstruction device 114 re-projects the image volume by using the ray tracing technique where no coefficient of the system matrix is cached. Moreover, one embodiment of the reconstruction device 114 simultaneously re-projects all rays in a subset. In the back-projection, one embodiment of the reconstruction device 114 uses a pixel-driven technique to back-project all of the normalized difference projection data in a subset to form the desired updated image volume. This and other embodiments performing other iterative reconstruction algorithms such as simultaneous algebraic reconstruction technique (SART) are optionally included in the current scope of the invention as more particularly claimed in the appended claims.

The OS-SART and TV steps provide somewhat opposing effects on the image quality during the reconstruction. After OS-SART, some sharpness is resulted due to a reduced number of errors in matching the real data while noise is increased in the updated image. As a result, the update image may appear sharp but noisy at the same time. In the total variation (TV) minimization step, one embodiment of the reconstruction device 114 repeats the TV minimization step X times where X is a predetermined number to improve noise at the cost of resolution.

One embodiment of the reconstruction device 114 advantageously determines a tradeoff between a resolution level and a noise level by updating an image using a pair of image updates together at the same time in a single step in an iterative reconstruction algorithm so as to optimize image quality. That is, for each iteration, an image is updated once using both the data fidelity update and the regularization update at the same time so that the control for minimizing the noise and the error is more efficient than applying one update and then the other update in a sequential manner.

Figure 4:
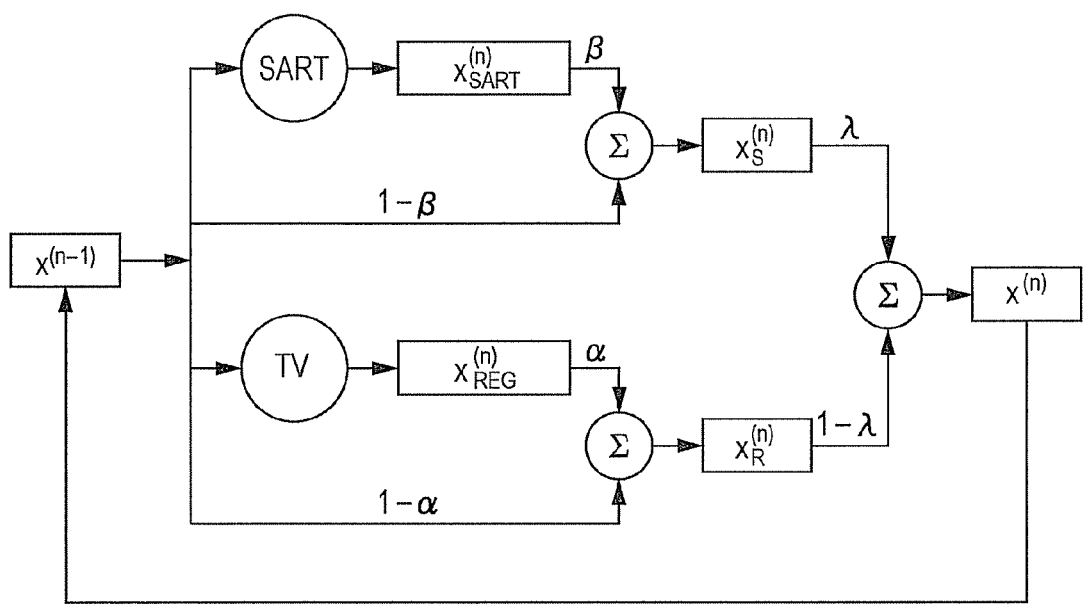
FIG. 4 is a diagram illustrating one embodiment of the reconstruction device according to the current invention.

Now referring to FIG. 4, a diagram illustrates one embodiment of the reconstruction device according to the current invention. The embodiment is implemented either as a software module, a hardware unit or a combination of both in the X-ray CT apparatus or scanner. In the following; the term, "unit" is used to mean any combination of software and hardware implementation. In general, the original image $x^{(n-1)}$ is processed by a SART unit and a TV unit, and the processing at the SART unit and the TV unit is either sequential, in parallel or any combination thereof That is, the SART unit and the TV unit independently perform their tasks to determine their outputs.

The SART unit performs on the original image $x^{(n-1)}$ to reduce an error amount in matching the real data and outputs a first intermediate image or image update $x_{SART}^{(n)}$, which now has an increased amount of noise. The first intermediate image or image update $x_{SART}^{(n)}$ is weighted by a relaxation parameter value or a first coefficient β. By the same token, the original image $x^{(n-1)}$ is weighted by a complementary relaxation parameter value or a first complementary coefficient (1−β). The two weighted images are summed together to a first normalized SART updated image $x_S^{(n)}$. During this independent process, the original image $x^{(n-1)}$ is not updated.

In an independent manner, the TV unit performs on the original image $x^{(n-1)}$ to reduce a noise level and outputs a second intermediate image or image update $x_{REG}^{(n)}$, which now has an increased amount of error in matching the real data. The second intermediate image or image update $x_{REG}^{(n)}$ is weighted by a regularization strength parameter value or a second coefficient α. By the same token, the original image $x^{(n-1)}$ is weighted by a complementary regularization strength parameter value or a second complementary coefficient (1−α). The two weighted images are summed together to a second normalized TV updated image $x_R^{(n)}$. During this independent process, the original image $x^{(n-1)}$ is not updated.

After the first normalized SART updated image $x_S^{(n)}$ and the second normalized TV updated image $x_R^{(n)}$ are independently obtained, these two images are added together while they are being normalized to output a reconstructed image $x^{(n)}$. The first normalized SART updated image $x_S^{(n)}$ is also called the data fidelity update and is further optionally weighted by a noise-resolution parameter value or a third coefficient λ. In this regard, the second normalized TV updated image $x_R^{(n)}$ is also called the regularization update and is further optionally weighted by a complementary noise-resolution parameter value or a third complementary coefficient (1−λ). That is, the independently determined data fidelity and regularization updates are optionally normalized by the third pair of coefficients, λ and (1−λ), which are generally determined by a user in an empirical manner. One exemplary user interface for determining the λ value is implemented as a turning knob.

Finally, the original image $x^{(n-1)}$ is updated based upon the reconstructed image $x^{(n)}$ in a single step. That is, for each iteration, the data fidelity update and the regularization update are summed together at the same time in a single step to generate the reconstructed image $x^{(n)}$ so that the original image $x^{(n-1)}$ is now updated in a single step. Thus, an image is updated once by using both the data fidelity update and the regularization update together at the same time so that the control for minimizing the noise and the error is more efficiently and effectively exerted than by applying these updates in a sequential manner. Consequently, the noise-resolution trade-off is substantially improved in the total-variation-based iterative reconstruction technique (TV-IR) such as TV-OS-SART.

Figure 5:
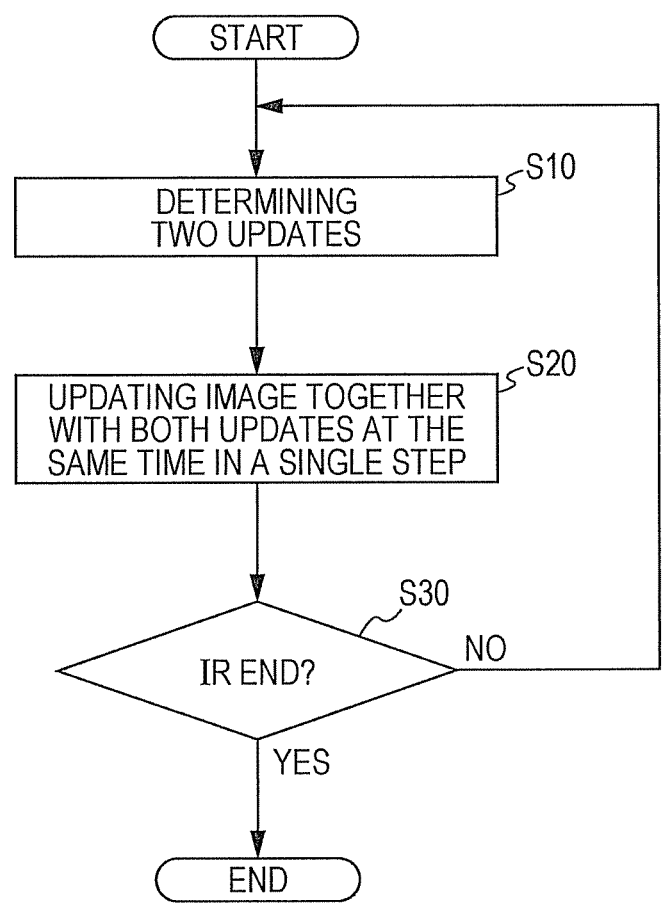
FIG. 5 is a flow chart illustrating steps involved in a process of optimizing image quality by updating an image using a pair of image updates together at the same time in a single step in an iterative reconstruction algorithm according to the current invention.

Now referring to FIG. 5, a flow chart illustrates steps involved in a process of optimizing image quality by updating an image using a pair of image updates together at the same time in a single step in an iterative reconstruction algorithm according to the current invention. In a first step S10, two updates such as the data fidelity update and the regularization update are independently determined. On the other, the tasks of obtaining the two updates may be implemented in a sequential process and or a parallel process. As described with respect to FIG. 4, the two updates such as the data fidelity update and the regularization update are determined respectively by the iterative reconstruction algorithm such as OS-SART and SART and the regularization algorithm such as total variation (TV). Both of the data fidelity update and the regularization update are weighted by predetermined parameters such as a relaxation parameter and a regularization strength parameter.

Still referring to FIG. 5, after the two updates such as the data fidelity update and the regularization update are determined in a predetermined independent manner, an image is updated using a pair of the two image updates together at the same time in a single step S20 in a predetermined iterative reconstruction algorithm according to the current invention. As described with respect to FIG. 4, the two updates such as the data fidelity update and the regularization update have almost opposite effects on noise and error. Thus, by applying the two updates in a sequential manner, the effects are not consistently improving in reducing the noise and error level in the original image. By concurrently applying the two image updates together, the effect of a single image update such as the data fidelity update or the regularization update is more readily blended in the original image for each of the iteration.

Finally, in a step S30, it is determined as to whether or not the iteration needs to end a predetermined iterative reconstruction algorithm such as OS-SART and SART in one exemplary process according to the current invention. In one exemplary process, the termination condition may be based upon a predetermined number of iterations. In another exemplary process, the termination condition may be based upon a predetermined condition in iterations. In any case, if the process is not yet ready to terminate as decided in the step S30, the exemplary process repeats from the step S10. On the other hand, if the step S30 determines that the exemplary process is to be terminated, the exemplary process outputs a reconstructed image and terminates its process.

Figure 6:
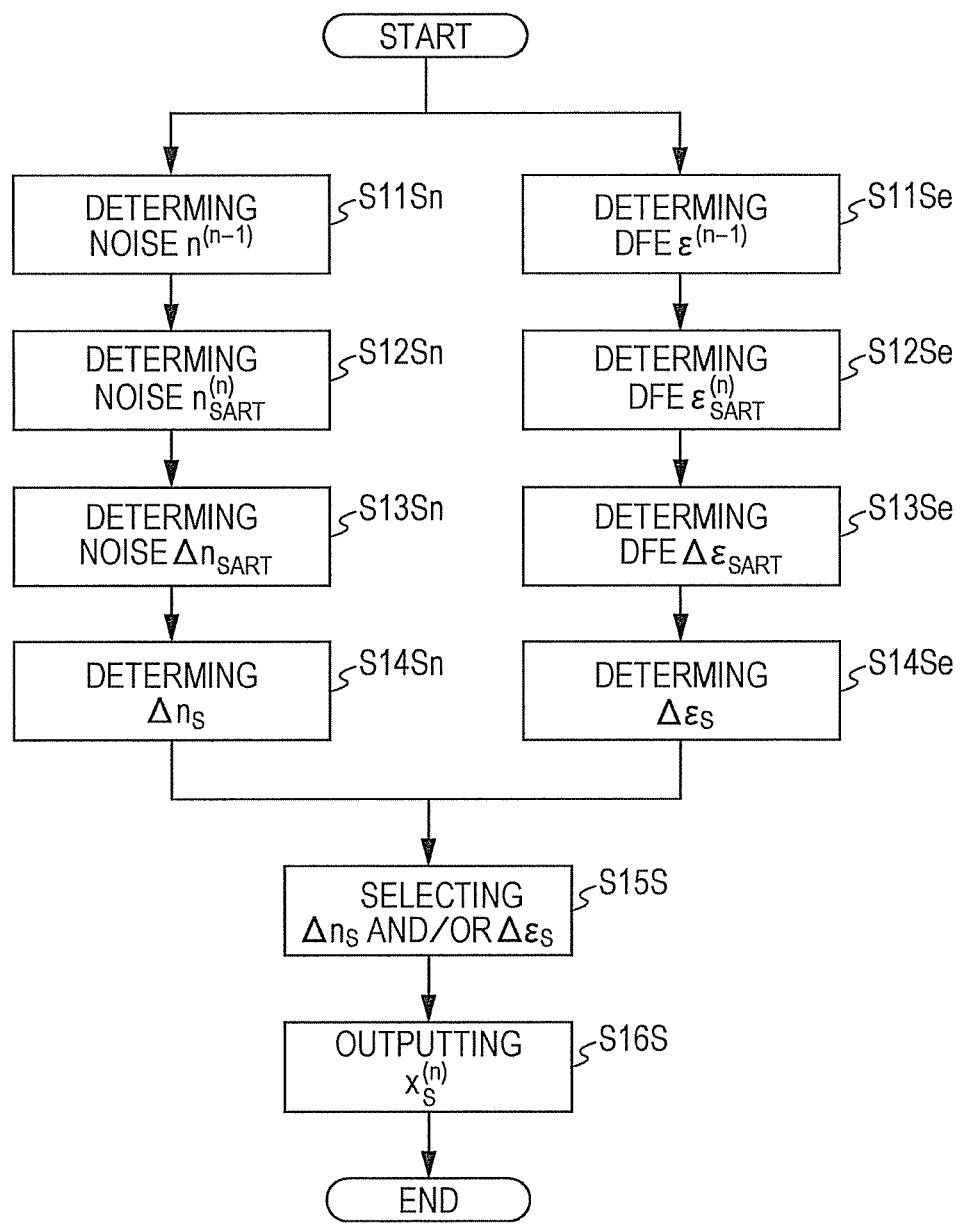
FIG. 6 is a flow chart illustrating steps involved in a process of independently determining the data fidelity update in an iterative reconstruction algorithm according to the current invention.

Now referring to FIG. 6, a flow chart illustrates steps involved in a process of independently determining the data fidelity update in an iterative reconstruction algorithm according to the current invention. In general, the data fidelity update is determined based upon certain statistical information such as noise and or error. The noise is a noise level in the original image and its updated image while the error is an amount of error in matching the real data in the original image and its updated image during the iterative process. Since the data fidelity update is determined based upon a combination of noise and error, steps S11Sn through S14Sn determine the data fidelity update based upon the noise information while steps S11Se through S14Se determine the data fidelity update based upon the error information. The data fidelity update reflects any combination of the two sources of the information.

For the noise-based determination, the steps S11Sn through S14Sn ultimately determine a weighted noise change. In a first step S11Sn, given an image $x^{(n-1)}$ at iteration n−1, noise $n^{(n-1)}$ is determined in the image $x^{(n-1)}$. A predetermined reconstructive technique including SART is applied to the image $x^{(n-1)}$ with a fixed relaxation parameter value having a strong value such as 1 so as to obtain $x_{SART}^{(n)}$=SART $[x^{(n-1)}]$ and to compute $n_{SART}^{(n)}$ in a step S12Sn from $x_{SART}^{(n)}$. Based upon the above determined noise values $n^{(n-1)}$ and $n_{SART}^{(n)}$ in the steps S11Sn and step S12Sn, the noise change $\Delta n_{SART} = n_{SART}^{(n)} - n^{(n-1)}$ is determined in the step S13Sn. Finally, a weighted noise change $\Delta n_S = \beta \Delta n_{SART}$, where β is the SART strength parameter or the relaxation parameter in S14Sn.

By the same token, for the error-based determination, the steps S11Se through S14Se ultimately determine a weighted error change. In a first step S11Se, given an image $x^{(n-1)}$ at iteration n−1, data fidelity error $\epsilon^{(n-1)}$ is determined in the image $x^{(n-1)}$. A predetermined reconstructive technique including SART is applied to the image $x^{(n-1)}$ with a fixed relaxation parameter value having a strong value such as 1 so as to obtain $x_{SART}^{(n)}=\text{SART}[x^{(n-1)}]$ and to compute $\epsilon_{SART}^{(n)}$ in a step S12Se from $x_{SART}^{(n)}$. Based upon the above determined data fidelity error values $\epsilon^{(n-1)}$ and $\epsilon_{SART}^{(n)}$ n the steps S11Se and step S12Se, the data fidelity error change $\Delta\epsilon_{SART}=\epsilon_{SART}^{(n)}-\epsilon^{(n-1)}$ is determined in the step S13Se. Finally, a weighted data fidelity error change $\Delta\epsilon_S=\beta\Delta\epsilon_{SART}$, where $\beta$ is the SART strength parameter or the relaxation parameter in S14Se.

In details, the SART update or data fidelity update $x_S^{(n)}$ is defined by $x_S^{(n)}=x^{(n-1)}+\beta(x_{SART}^{(n)})$, where $(x_{SART}^{(n)}-x^{(n-1)})$ is obtained in terms of $\Delta n_{SART}$ alone, $\Delta\epsilon_{SART}$ alone or a combination of $\Delta n_{SART}$ and $\Delta\epsilon_{SART}$ as illustrated in a step S15S of FIG. 6. Upon selecting a combination of noise and error, a step S16S outputs the SART update or data fidelity update $x_S^{(n)}$. The above described steps are merely exemplary in determining the SART update or data fidelity update $x_S^{(n)}$, and a proper scope of the current invention is not limited to the above exemplary steps.

Figure 7:
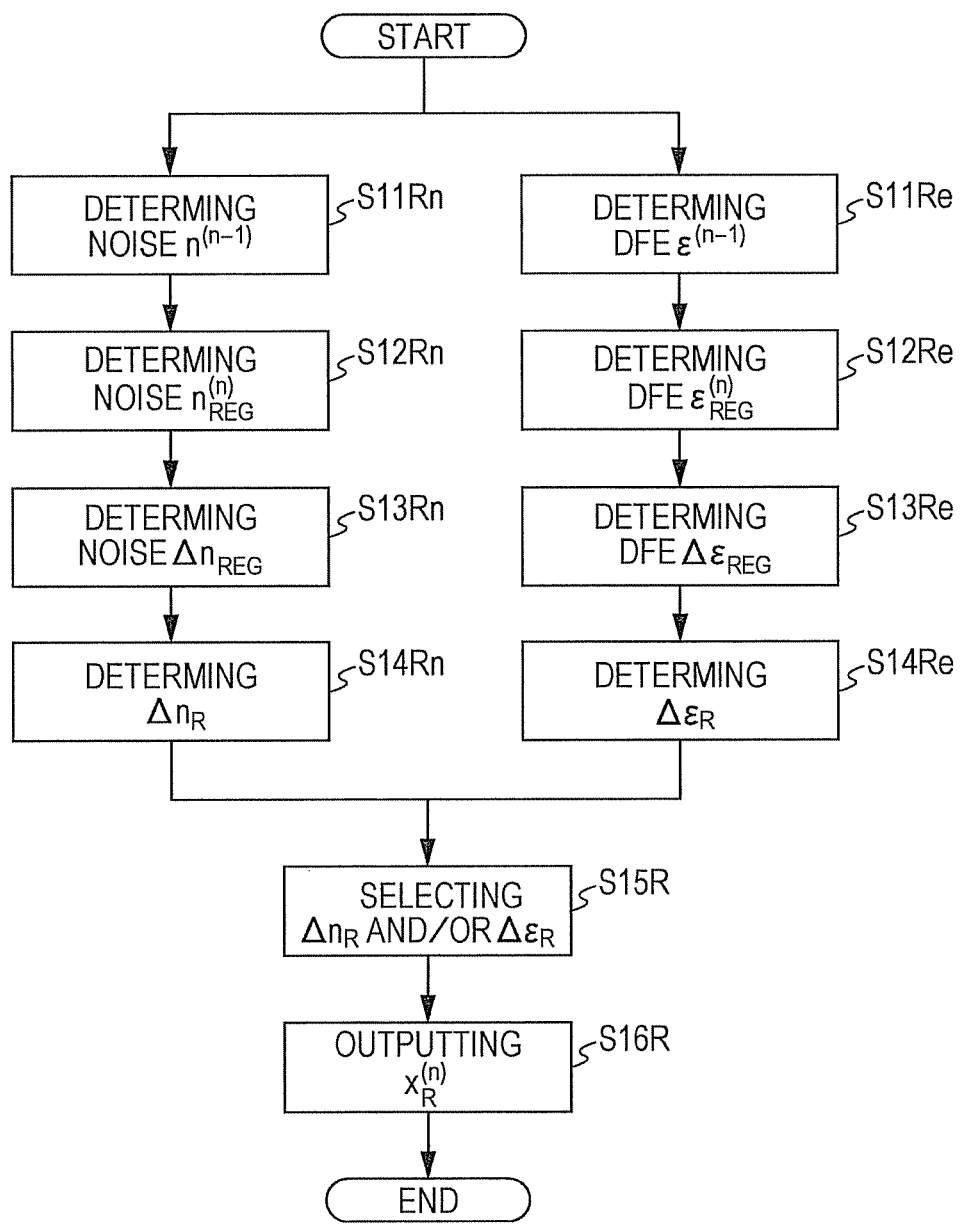
FIG. 7 is a flow chart illustrating steps involved in a process of independently determining the regularization update in an iterative reconstruction algorithm according to the current invention.

Now referring to FIG. 7, a flow chart illustrates steps involved in a process of independently determining the regularization update in an iterative reconstruction algorithm according to the current invention. In general, the regularization update is determined based upon certain statistical information such as noise and or error. The noise is a noise level in the original image and its updated image while the error is an amount of error in matching the real data in the original image and its updated image during the iterative process. Since the regularization update is determined based upon a combination of noise and error, steps S11Rn through S14Rn determine the regularization update based upon the noise information while steps S11Re through S14Re determine the regularization update based upon the error information. The regularization update reflects any combination of the two sources of the information.

For the noise-based determination, the steps S11Rn through S14Rn ultimately determine a weighted noise change. In a first step S11Rn, given an image $x^{(n-1)}$ at iteration n−1, noise $x^{(n-1)}$ is determined in the image $x^{(n-1)}$. A predetermined regularization technique including total variation (TV) minimization is applied to the image $x^{(n-1)}$ with a fixed regularization parameter value having a strong value such as 1 so as to obtain $x_{REG}^{(n)}=\text{REG}[x^{(n-1)}]$ and to compute $n_{REG}^{(n)}$ in a step S12Rn from $x_{REG}^{(n)}$. Based upon the above determined noise values $n^{(n-1)}$ and $n_{REG}^{(n)}$ in the steps S11Rn and step S12Rn, the noise change $\Delta n_{REG}=n_{REG}^{(n)}-n^{(n-1)}$ is determined in the step S13Rn. Finally, a weighted noise change $\Delta n_R=\alpha\Delta n_{REG}$, where $\alpha$ is the TV strength parameter or the regularization strength parameter in S14Rn.

By the same token, for the error-based determination, the steps S11Re through S14Re ultimately determine a weighted error change. In a first step S11Re, given an image $x^{(n-1)}$ at iteration n−1, data fidelity error $\epsilon^{(n-1)}$ is determined in the image $x^{(n-1)}$. A predetermined regularization technique including TV minimization is applied to the image $x^{(n-1)}$ with a fixed regularization parameter value having a strong value such as 1 so as to obtain $x_{REG}^{(n)}=\text{REG}[x^{(n-1)}]$ and to compute $\epsilon_{REG}^{(n)}$ in a step S12Re from $x_{REG}^{(n)}$. Based upon the above determined regularization error values $\epsilon^{(n-1)}$ and $\epsilon_{REG}^{(n)}$ in the steps S11Re and step S12Re, the regularization error change $\Delta\epsilon_{REG}=\epsilon_{REG}^{(n)}-\epsilon^{(n-1)}$ is determined in the step S13Re. Finally, a weighted regularization error change $\Delta\epsilon_R=\alpha\Delta\epsilon_{REG}$, where $\alpha$ is the TV strength parameter or the regularization strength parameter in S14Re.

In details, the TV update or regularization update $x_R^{(n)}$ is defined by $x_R^{(n)}=x^{(n-1)}+\alpha(x_{REG}^{(n)}-x^{(n-1)})$, where $(x_{REG}^{(n)}-x^{(n-1)})$ is obtained in terms of $\Delta n_{REG}$ alone, $\Delta\epsilon_{REG}$ alone or a combination of $\Delta n_{REG}$ and $\Delta\epsilon_{REG}$ as illustrated in a step S15R of FIG. 7. Upon selecting a combination of noise and error, a step S16R outputs the TV update or regularization update $x_R^{(n)}$. The above described steps are merely exemplary in determining the TV update or regularization update $x_R^{(n)}$, and a proper scope of the current invention is not limited to the above exemplary steps.

Figure 8:
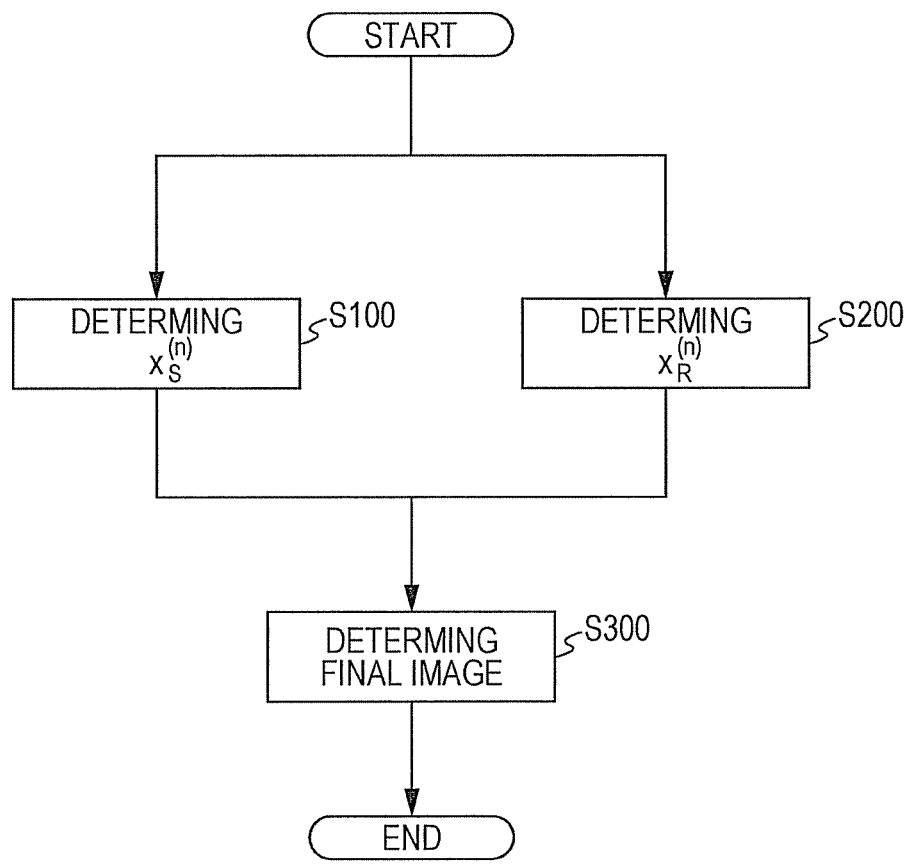
FIG. 8 is a flow chart illustrating steps involved in a process of concurrently updating an image using independently determined updates together at the same time in a single step of an iterative reconstruction algorithm according to the current invention.

Now referring to FIG. 8, a flow chart illustrates steps involved in a process of concurrently updating an image using independently determined updates together at the same time in a single step of an iterative reconstruction algorithm according to the current invention. In general, as described above with respect to FIGS. 6 and 7, the data fidelity update $x_S^{(n)}$ and the regularization update $x_R^{(n)}$ are independently obtained respectively in step S100 and S200 based upon certain statistical information such as noise and or error. These independently determined updates $x_S^{(n)}$ and $x_R^{(n)}$ are now concurrently applied to update an image in a single step S300 of an exemplary iterative reconstruction process to generate an updated image according to the current invention. The updated image is used in a next iterative process of the reconstruction algorithm according to the current invention. In the step S300, a third additional weight parameter $\lambda$ is optionally applied to generate an updated image.

Figure 9:
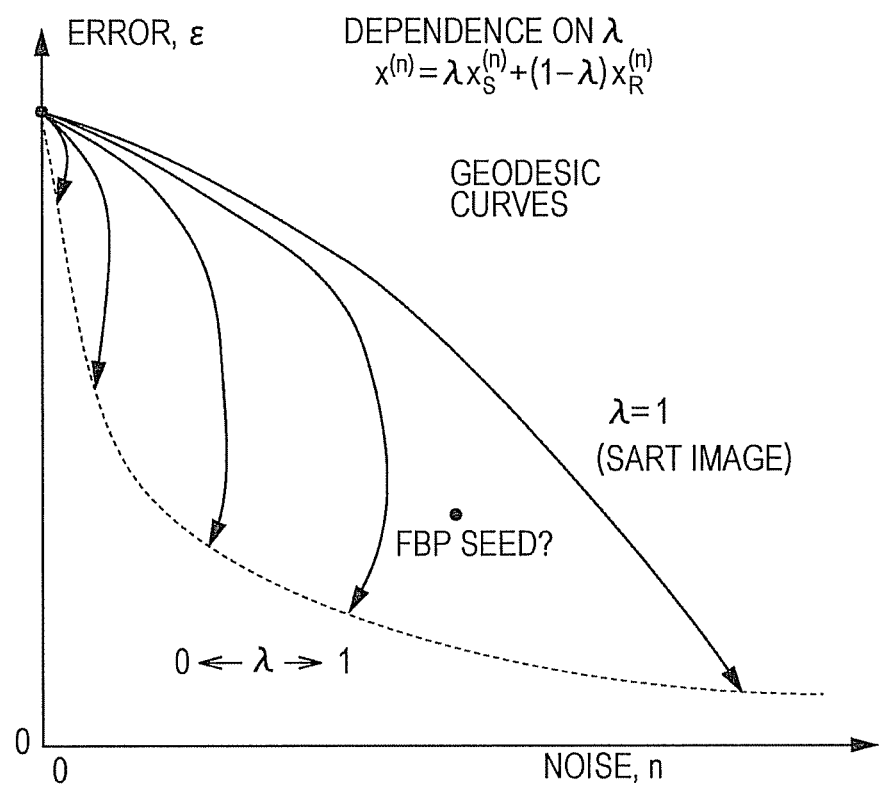
FIG. 9 is a graph showing the effect of a third weight parameter λ in controlling error and noise according to the current invention.

In general, error and noise may be optionally controlled by an additional parameter as an image $x^{(n)}$ is updated based upon the data fidelity update $x_S^{(n)}$ and the regularization update $x_R^{(n)}$. As illustrated in FIG. 9, the update image as generated in the step S300 of FIG. 8 depends upon a third additional weight parameter $\lambda$ in controlling error and noise according to the current invention. The final image $x^{(n)}$ is expressed by $\lambda x_S^{(n)}+(1-\lambda)x_R^{(n)}$ in relation to the two updates, and error and noise in the final image depend upon a value of the third additional weight parameter $\lambda$. In other words, the noise-resolution is optionally controlled by the third additional weight parameter $\lambda$. As the $\lambda$ value increases to 1, the error decreases while the noise increases. In other words, the image $x^{(n)}$ becomes more like a SART image with a sharp appearance but a noisy background. On the other hand, as the $\lambda$ value decreases, the error increases while the noise decreases.

Figure 10A:
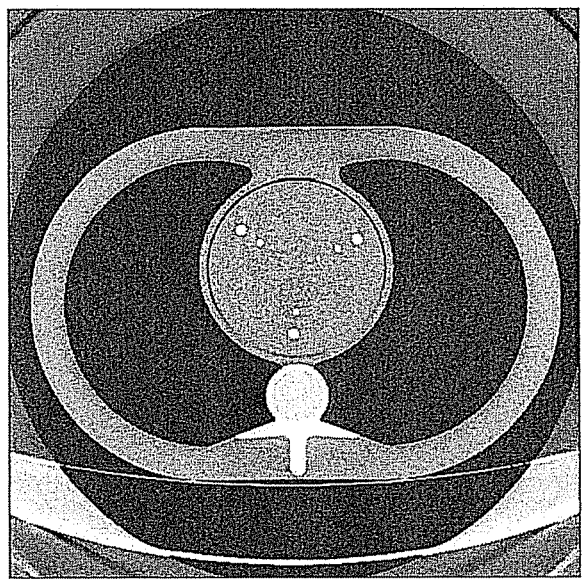
FIG. 10A illustrates an exemplary image of a real physical phantom as reconstructed by a predetermined iterative technique by concurrently applying the two updates on projection data having 1200 views according to the current invention.
Figure 10B:
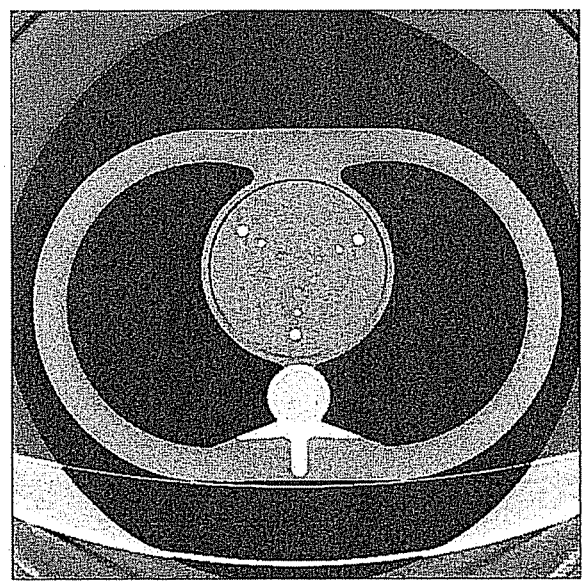
FIG. 10B illustrates an exemplary image of the real physical phantom as reconstructed by the predetermined iterative technique by concurrently applying the two updates on projection data having 600 views according to the current invention.
Figure 10C:
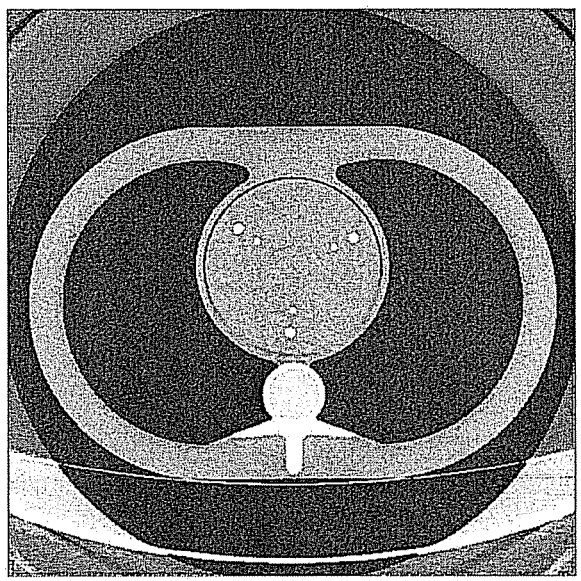
FIG. 10C illustrates an exemplary image of the real physical phantom as reconstructed by the predetermined iterative technique by concurrently applying the two updates on projection data having 400 views according to the current invention.
Figure 10D:
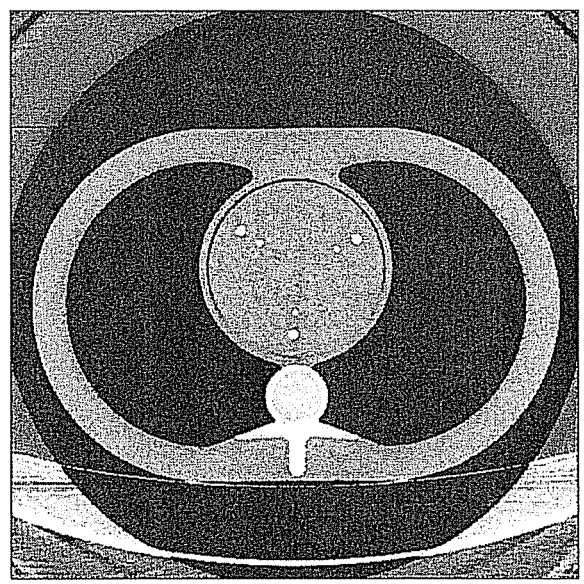
FIG. 10D illustrates an exemplary image of the real physical phantom as reconstructed by the predetermined iterative technique by concurrently applying the two updates on projection data having 240 views according to the current invention.

FIG. 10A illustrates an exemplary image of a real physical phantom as reconstructed by a predetermined iterative technique by concurrently applying the two updates on projection data having 1200 views according to the current invention. FIG. 10B illustrates an exemplary image of the real physical phantom as reconstructed by the predetermined iterative technique by concurrently applying the two updates on projection data having 600 views according to the current invention. FIG. 10C illustrates an exemplary image of the real physical phantom as reconstructed by the predetermined iterative technique by concurrently applying the two updates on projection data having 400 views according to the current invention. FIG. 10D illustrates an exemplary image of the real physical phantom as reconstructed by the predetermined iterative technique by concurrently applying the two updates on projection data having 240 views according to the current invention.

The exemplary images of FIGS. 10A through 10D show that the concurrent update application according to the current invention substantially maintains the reconstructed property of the iterative technique in the image quality despite the projection data having a different number of views raging from a sparse view such as 240 views and a full view such as 1200 views.

Figure 11A:
FIG. 11A illustrates an exemplary image as reconstructed from cadaver data by a predetermined iterative technique by concurrently applying the two updates on projection data with a noise-resolution parameter value of 0.75 according to the current invention.
Figure 11B:
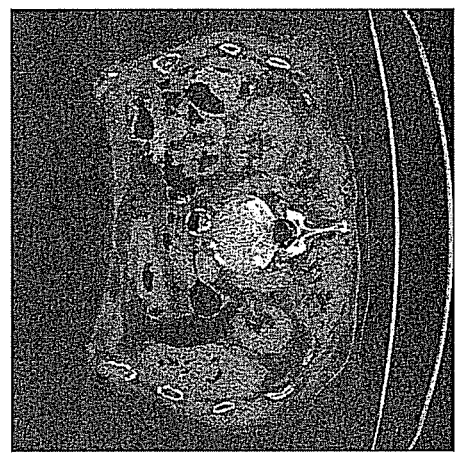
FIG. 11B illustrates an exemplary image as reconstructed from cadaver data by a predetermined iterative technique by concurrently applying the two updates on projection data with a noise-resolution parameter value of 0.80 according to the current invention.
Figure 11C:
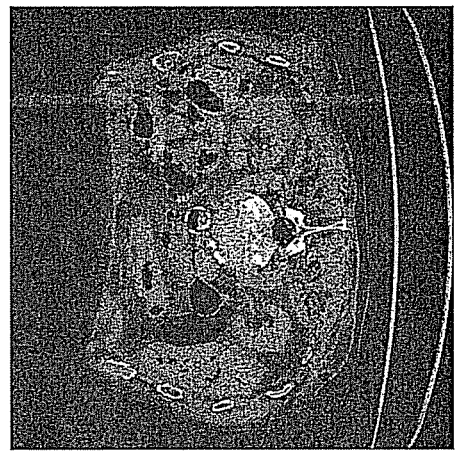
FIG. 11C illustrates an exemplary image as reconstructed from cadaver data by a predetermined iterative technique by concurrently applying the two updates on projection data with a noise-resolution parameter value of 0.90 according to the current invention.

FIG. 11A illustrates an exemplary image as reconstructed from cadaver data by a predetermined iterative technique by concurrently applying the two updates on projection data with a noise-resolution parameter value of 0.75 according to the current invention. FIG. 11B illustrates an exemplary image as reconstructed from cadaver data by a predetermined iterative technique by concurrently applying the two updates on projection data with a noise-resolution parameter value of 0.80 according to the current invention. FIG. 11C illustrates an exemplary image as reconstructed from cadaver data by a predetermined iterative technique by concurrently applying the two updates on projection data with a noise-resolution parameter value of 0.90 according to the current invention. These exemplary images show that the noise-resolution parameter value controls the noise-resolution characteristics.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of regularization-based iterative reconstruction, comprising:
    obtaining a data fidelity update of image data;
    obtaining a regularization update of the image data;
    updating the image data at the current iteration according to a linear combination of the image data at a previous iteration both together with the data fidelity update and the regularization update at the same time in a single step.

2. The method of regularization-based iterative reconstruction according to claim 1 wherein said data fidelity update and said regularization update are obtained concurrently.

3. The method of regularization-based iterative reconstruction according to claim 1 wherein said data fidelity update and said regularization update are sequentially obtained.

4. The method of regularization-based iterative reconstruction according to claim 3 wherein the data fidelity update is obtained before the regularization update.

5. The method of regularization-based iterative reconstruction according to claim 3 wherein the regularization update is obtained before the data fidelity update.

6. The method of regularization-based iterative reconstruction according to claim 1 wherein coefficients are independently determined to obtain said data fidelity update and said regularization update.

7. The method of regularization-based iterative reconstruction according to claim 1 wherein the data fidelity update is obtained by one of simultaneous algebraic reconstruction technique (SART) and algebraic reconstruction technique (ART).

8. The method of regularization-based iterative reconstruction according to claim 1 wherein the regularization update is obtained by total variation (TV).

9. A system for regularization-based iterative reconstruction, comprising:
    a data fidelity update processing unit for obtaining a data fidelity update of image data;
    a regularization update processing unit for obtaining a regularization update of the image data;
    a update processing unit connected to said data fidelity update processing unit and said regularization update processing unit for updating the image data at the current iteration according to a linear combination of the image data at a previous iteration both together with the data fidelity update and the regularization update at the same time in a single step.

10. The system for regularization-based iterative reconstruction according to claim 9 wherein said data fidelity update and said regularization update are obtained concurrently.

11. The system for regularization-based iterative reconstruction according to claim 9 wherein said data fidelity update and said regularization update are sequentially obtained.

12. The system for regularization-based iterative reconstruction according to claim 11 wherein the data fidelity update is obtained before the regularization update.

13. The system for regularization-based iterative reconstruction according to claim 11 wherein the regularization update is obtained before the data fidelity update.

14. The system for regularization-based iterative reconstruction according to claim 9 wherein coefficients are independently determined to obtain said data fidelity update and said regularization update.

15. The system for regularization-based iterative reconstruction according to claim 9 wherein the data fidelity update is obtained by one of simultaneous algebraic reconstruction technique (SART) and algebraic reconstruction technique (ART).

16. The system for regularization-based iterative reconstruction according to claim 9 wherein the regularization update is obtained by total variation (TV).

* * * * *